(12) United States Patent
Parsons

(10) Patent No.: US 8,517,604 B2
(45) Date of Patent: Aug. 27, 2013

(54) APPARATUS FOR DETERMINING AN AIR TEMPERATURE

(75) Inventor: John Patrick Parsons, Afton, NY (US)

(73) Assignee: Unison Industries, LLC, Jacksonville, FL (US)

(*) Notice: Subject to any disclaimer, the term of this patent is extended or adjusted under 35 U.S.C. 154(b) by 5 days.

(21) Appl. No.: 13/333,378

(22) Filed: Dec. 21, 2011

(65) Prior Publication Data

US 2013/0163636 A1  Jun. 27, 2013

(51) Int. Cl.
*G01K 1/08* (2006.01)
(52) U.S. Cl.
USPC ........................................... 374/158
(58) Field of Classification Search
USPC .................. 374/158; 73/861.42
See application file for complete search history.

(56) References Cited

U.S. PATENT DOCUMENTS

| | | | | |
|---|---|---|---|---|
| 6,543,298 | B2* | 4/2003 | Cronin et al. | 73/861.65 |
| 6,759,962 | B2* | 7/2004 | Severson et al. | 340/580 |
| 6,901,814 | B2* | 6/2005 | Vozhdaev et al. | 73/861.65 |
| 6,941,805 | B2* | 9/2005 | Seidel et al. | 73/170.02 |
| 7,174,782 | B2* | 2/2007 | Ice | 73/204.22 |
| 7,845,222 | B1* | 12/2010 | Goedel et al. | 73/170.02 |
| 2002/0158768 | A1* | 10/2002 | Severson et al. | 340/581 |
| 2003/0010109 | A1* | 1/2003 | Cronin et al. | 73/170.12 |
| 2005/0193812 | A1* | 9/2005 | Ice | 73/170.02 |
| 2006/0216476 | A1* | 9/2006 | Ganti et al. | 428/143 |
| 2010/0296935 | A1* | 11/2010 | Kamen et al. | 416/205 |
| 2012/0285261 | A1* | 11/2012 | Goedel | 73/861.42 |

\* cited by examiner

*Primary Examiner* — Lisa Caputo
*Assistant Examiner* — Jamel Williams
(74) *Attorney, Agent, or Firm* — McGarry Bair PC

(57) ABSTRACT

An apparatus for determining air temperature such as an air temperature sensor suitable for use on an aircraft, such as on an aircraft engine, and where the air temperature sensor may be exposed to adverse conditions including high Mach numbers and icing conditions as well as water and debris and be capable of providing accurate temperature readings.

19 Claims, 5 Drawing Sheets

APPARATUS FOR DETERMINING AN AIR TEMPERATURE

BACKGROUND OF THE INVENTION

Total air temperature is a term used generally in aviation. In other applications it is called stagnation temperature. Total air temperature is measured by a specially designed temperature probe mounted on the surface of the aircraft or the interior walls of a turbine engine. The probe is designed to bring the air to rest relative to the aircraft. As the air is brought to rest, the air experiences an adiabatic increase in temperature. Therefore, total air temperature is higher than the static air temperature. Total air temperature is an essential input for calculating static air temperature and hence true airspeed. Because the total air temperature probes are often mounted in front of the jet engine it is often exposed to adverse conditions including high Mach numbers and icing conditions as well as water and debris, which may affect the reading provided by the temperature probe.

BRIEF DESCRIPTION OF THE INVENTION

In one embodiment, an air temperature sensor suitable for use on an aircraft includes a housing having at least a portion with an airfoil cross section to define an airfoil portion with an upper surface and lower surface, a temperature sensor located within the airfoil portion, and an air flow path having an inlet in lower surface and extending to the temperature sensor to provide for diverted air from air flowing along the lower surface to contact the temperature sensor, wherein a transition formed by a junction of the inlet and the lower surface prevents liquid entrained in an airflow along the lower surface from reaching the temperature sensor.

DESCRIPTION OF EMBODIMENTS OF THE INVENTION

Figure 1:
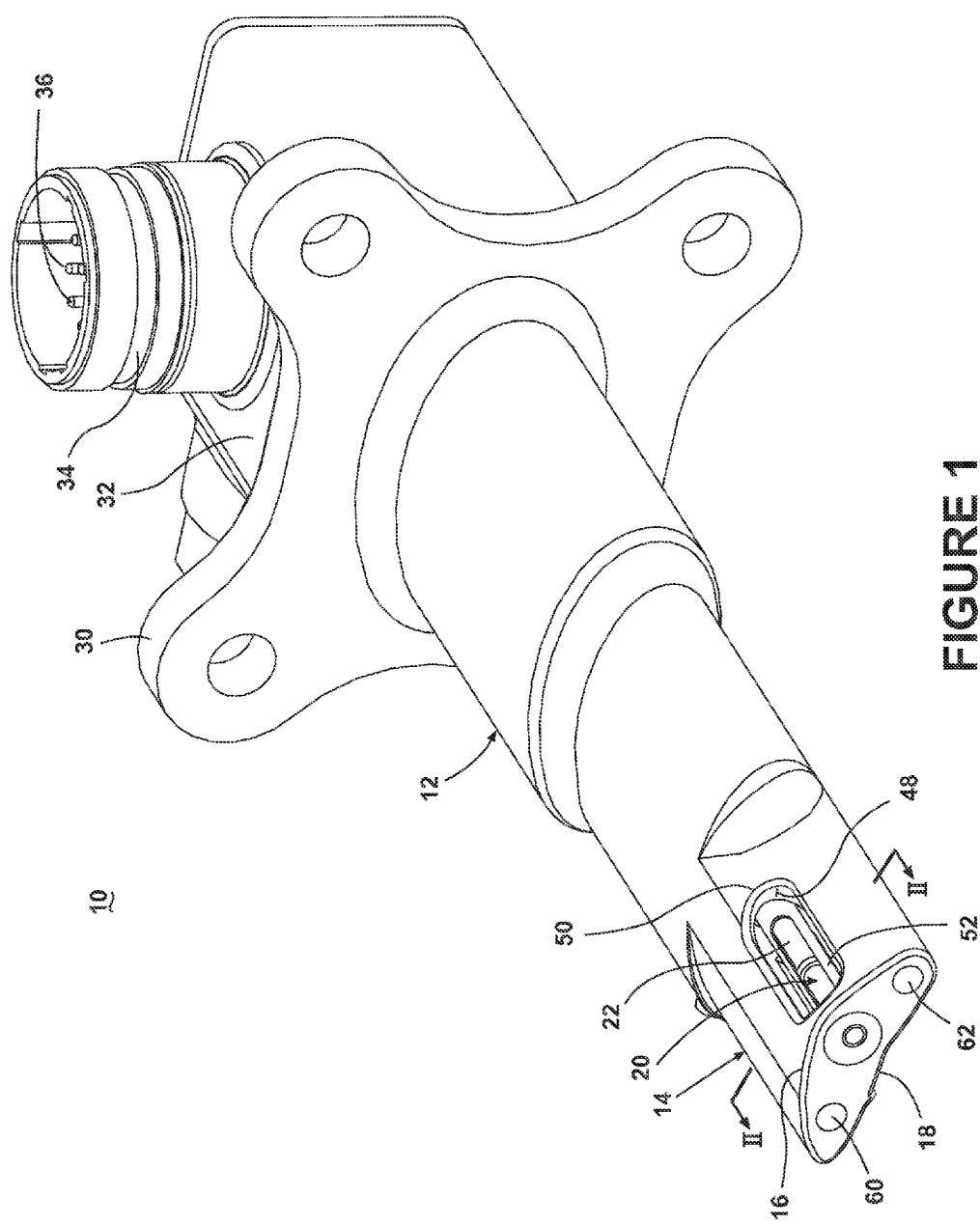
FIG. 1 is a perspective view illustrating an air temperature sensor according to an embodiment of the invention.

FIG. 1 illustrates an air temperature sensor 10 according to one embodiment of the invention. A housing 12 of the air temperature sensor 10 is illustrated as having a portion with an airfoil cross section, which defines an airfoil portion 14. The airfoil portion 14 includes an upper surface 16 and lower surface 18. A temperature sensor 20 is located within the airfoil portion 14. The temperature sensor 20, which will include a temperature sensor housing 22 for a thermometer or resistive temperature device sensing element, may sense the temperature of fluid passing by the temperature sensor housing 22.

The air temperature sensor 10 may be a total air temperature sensor and may be suitable for use on an aircraft or jet engine (not shown). The housing 12 may be mounted to an outside surface of the aircraft such as on the fuselage or on the internal surfaces of a jet engine of the aircraft. The housing 12 may be made of any suitable material including by way of non-limiting examples stainless steel and nickel alloys, which may be capable of maintaining their form during operation of the aircraft. The housing 12 may include a flange 30 for mounting the air temperature sensor 10 to the aircraft or jet engine in a suitable manner. A connector 32 is illustrated as being fitted to the flange 30 on a side opposite from the airfoil portion 14. The connector 32 may include any duct 34 that provides a path for electrical connections 36 to and from the air temperature sensor 10. The electrical connections 36 may operably couple the air temperature sensor 10 to a power source, to an electronic device that may process a signal being output by the air temperature sensor 10, and a controller.

Figure 2:
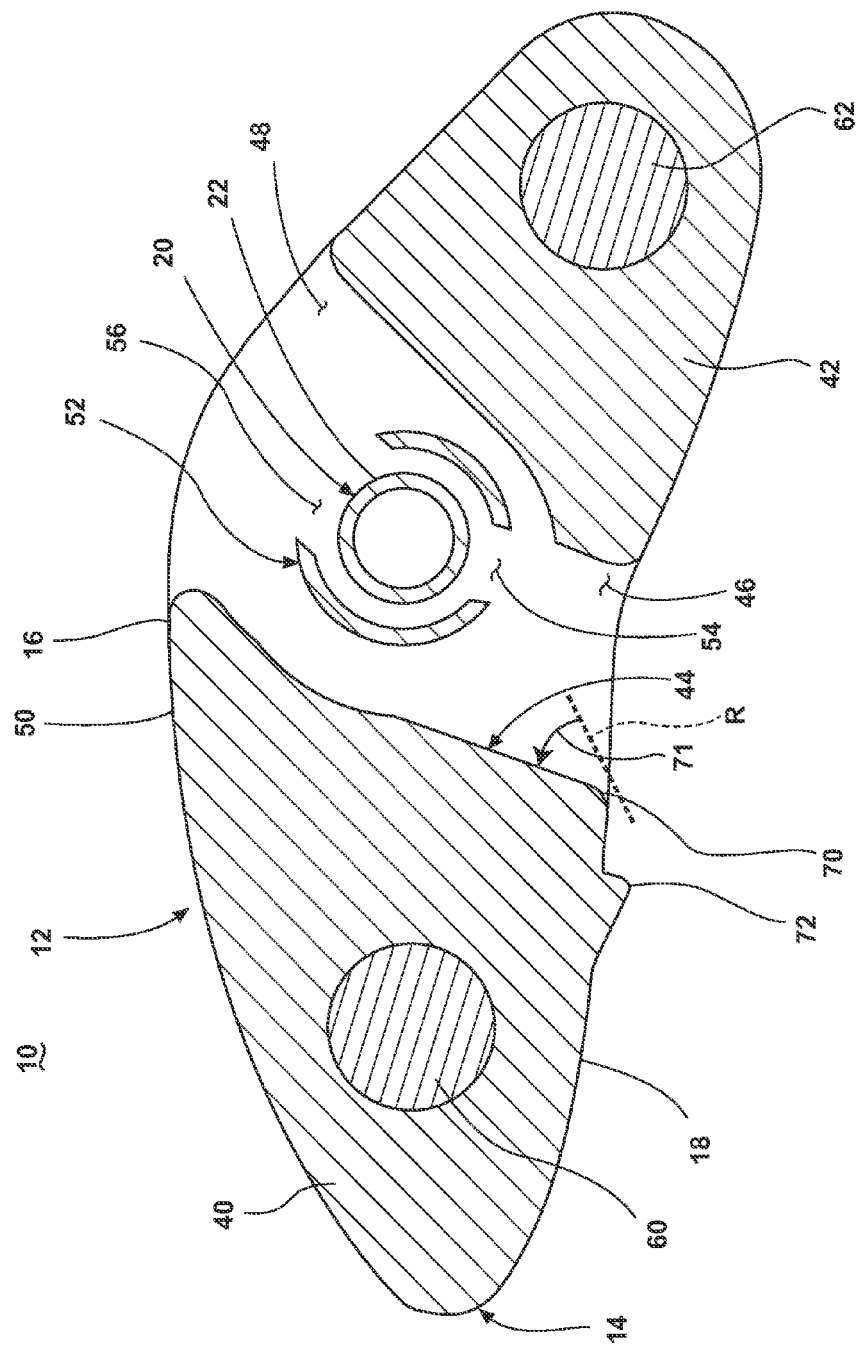
FIG. 2 is a cross-sectional view illustrating the air temperature sensor of FIG. 1.

FIG. 2 more clearly illustrates that the airfoil portion 14 has an asymmetrical cross section. It will be understood that the asymmetrical cross section of the airfoil portion 14 is for exemplary purposes only and that alternative asymmetrical cross-sections may be used and symmetrical cross sections may be used to form the airfoil portion 14. A passageway 44 is provided in the airfoil portion 14 that separates the airfoil portion 14 into first and second airfoil portions 40 and 42. The passageway 44 that has an inlet 46 in the lower surface 18 of the airfoil portion 14 and extends through the airfoil portion 14. Such a passageway 44 defines an air flow path in the air temperature sensor 10 that extends to the temperature sensor 20 to direct air to contact the temperature sensor 20. The passageway 44 has an outlet 48 located on an exterior 50 of the airfoil portion 14. The outlet 48 may be provided on the upper surface 16 of the airfoil portion 14 as illustrated.

A sheath 52 may be being located within the passageway 44 and is illustrated as partially circumscribing the temperature sensor 20. The sheath 52 includes an inlet opening 54 through which diverted air in the passageway 44 may contact the temperature sensor 20 and an outlet opening 56. The inlet opening 54 and outlet opening 56 are configured in such a manner to stagnate the airflow around the temperature sensor housing 22. The sheath 52 may be shaped in any suitable manner and orientated in any suitable manner with respect to the passageway 44 and the temperature sensor 20. The passageway 44 and sheath 52 function to form an airflow stagnation area about the temperature sensor 20 to provide for a total air temperature reading by the temperature sensor 20.

A heating element may be located within with the airfoil portion 14 and both a first heating element 60 and a second heating element 62 have been illustrated. The first and second heating elements 60 and 62 are located within the airfoil portion 14 on opposite sides of the passageway 44 and the air flow path. The first heating element 60 is illustrated as being embedded within the first airfoil portion 40 and the second heating element 62 is illustrated as being embedded within the second airfoil portion 42. The first and second heating elements 60 and 62 may be used as a deicing heater that deices the air temperature sensor 10 when the air temperature sensor 10 is exposed to icing conditions. The first and second heating elements 60 and 62 may be any suitable type of heating element including low wattage, low heat transfer cartridge heaters. It will be understood that the first and second heating elements 60 and 62 may be used to deice a large portion of the air temperature sensor 10 or a smaller portion of the air temperature sensor 10.

Figure 3:
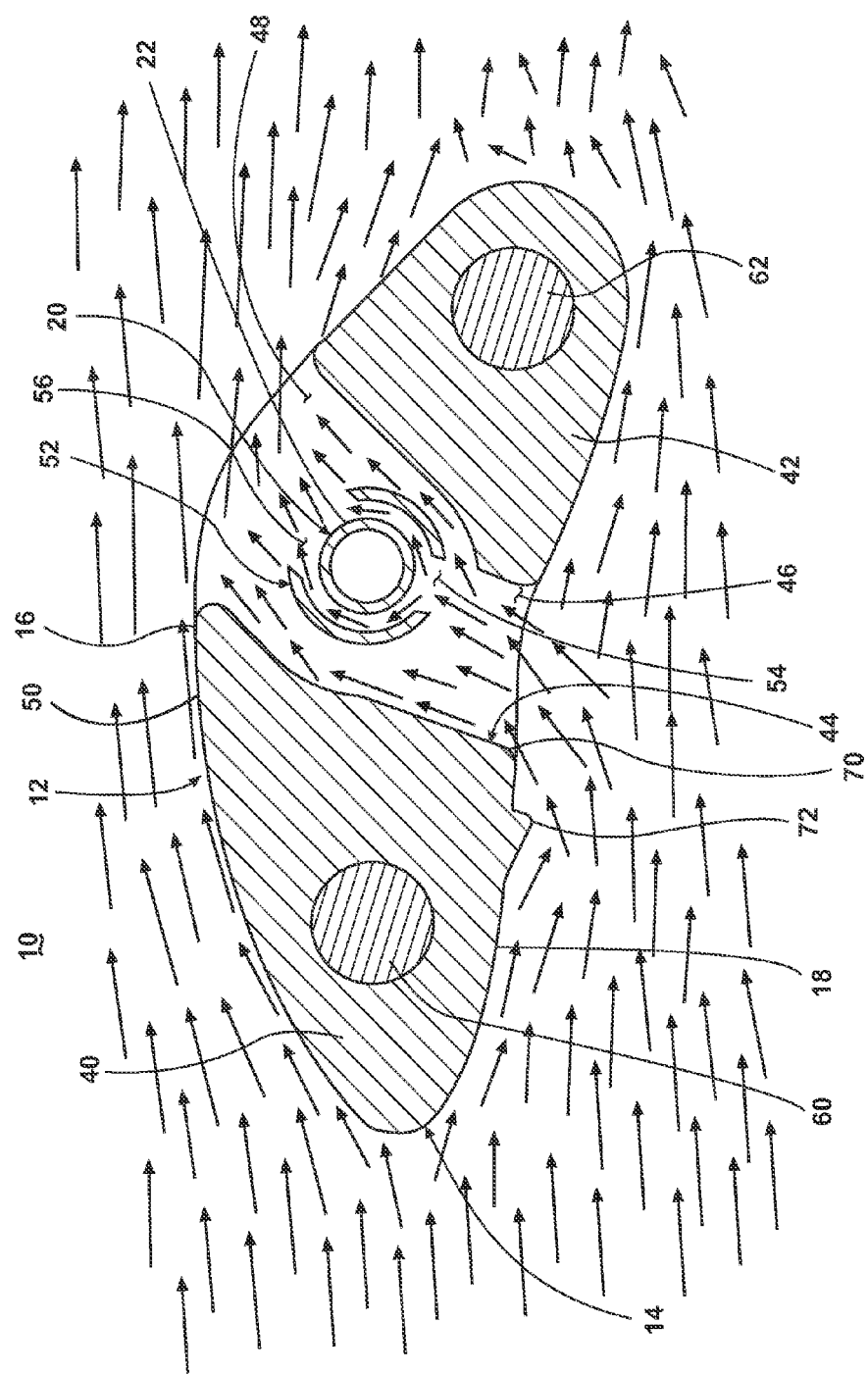
FIG. 3 is a cross-sectional view illustrating a flow of air around the air temperature sensor of FIG. 1.

FIG. 3 uses a series of arrows to illustrate fluid flow around the air temperature sensor 10 as well as the air flow path through the passageway 44 in the air temperature sensor 10. The air flow path in the air temperature sensor 10 has an inlet in the lower surface 18 and extends through the airfoil portion 14 to the outlet on the upper surface 16. The air flow path extends to the temperature sensor 20 to provide for diverted air from air flowing along the lower surface 18 to contact the temperature sensor 20. A transition 70 formed by a junction of the inlet 46 and the lower surface 18 prevents liquid entrained in an airflow along the lower surface 18 from reaching the temperature sensor 20. The shape of the junction defines an angle 71 that can be turned by the air flow but not by the entrained liquid causing the entrained liquid to not follow the diverted air. Any suitable angle 71 may be used and such an angle 71 may vary depending upon the shape of the airfoil portion 14. For the illustrated airfoil portion 14 the angle 71 that the air flow must turn to enter the passageway 44 is about 53 degrees relative to the incoming flow path, which is illustrated with reference line R. A drip guard 72 may be located along the lower surface 18 and upstream of the inlet 46 such that any liquid traveling along the lower surface 18 will be kicked out away from the passageway 44 and the temperature sensor 20. The drip guard 72 may be formed in any suitable manner and essentially acts to wick moisture away from the inlet 46.

During operation, the airfoil portion 14 works by generating a high pressure area on the lower surface 18 of the airfoil portion 14 and a low pressure area on the upper surface 16 of the airfoil portion 14. The passageway 44 links the low pressure area with the high pressure area. The passageway 44 directs air from the high pressure side of the airfoil portion 14 to the low pressure side of the airfoil portion 14. Because the passageway 44 is located at an angle to the incoming flow the pressure differential generated by the airfoil portion 14 forces the flow of air to make the angled turn before entering the passageway 44 and the sheath 52 thereby removing water from the flow of air. Because the air molecules have a low mass they may more easily change direction and enter the passageway 44 whereas water molecules have a relatively large mass and are unable make the same turn into the passageway 44. In this manner, the water entrained in the air is filtered out of the flow of air entering the passageway 44.

Thus, air flows into the inlet 46 of the passageway 44 and may pass by the temperature sensor 20. The temperature sensor 20 produces an electrical signal as a function of a temperature of the air, which may be sent through the electrical connections 36 to an appropriate controller or computer. Air in the passageway 44 then exits via the outlet 48.

More specifically, as the air moves through the passageway 44, a portion of the air entering the inlet 46 exits the outlet 48 while another portion of the air enters the sheath 52. The air enters the sheath 52 through the inlet opening 54. The inlet opening 54 reduces the velocity of the air flow and as temperature is a function of molecular velocity, reducing the velocity of the air causes the temperature sensor 20 to read closer to the total temperature as opposed to the static temperature and allows the temperature sensor 20 to read the true temperature of the air at high Mach numbers.

Figure 4:
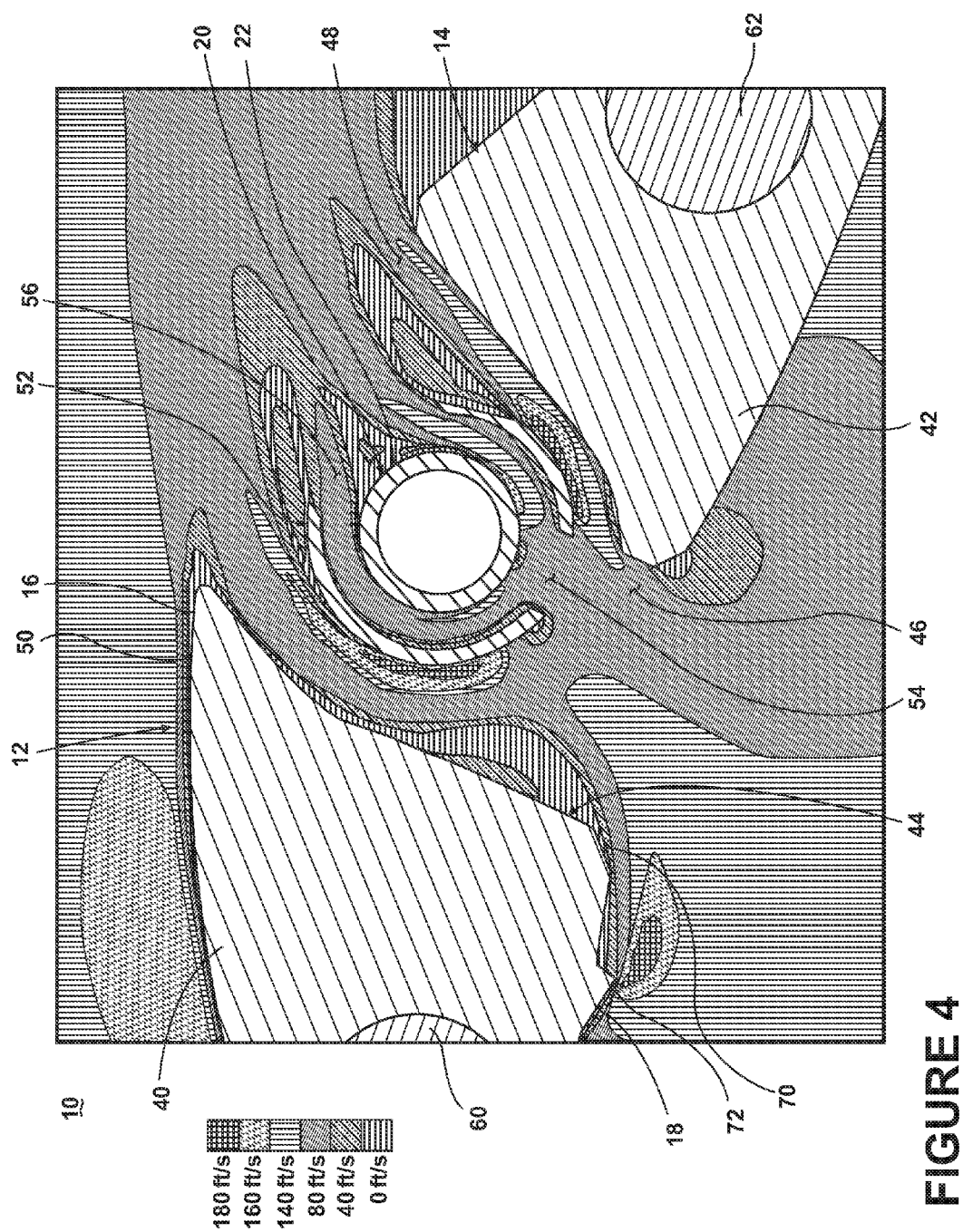
FIG. 4 is a cross-sectional view illustrating an exemplary velocity profile created by the air temperature sensor of FIG. 1.

By way of example only, a velocity profile that may be achieved during operation has been schematically illustrated in FIG. 4. As may be seen, velocities near the temperature sensor 20 are reduced by approximately 250% compared to the free stream velocity profile, resulting in a stagnation point that provides for the temperature sensor 20 to sense a total temperature. The sheath 52 also increases the useable surface around the temperature sensor 20 and essentially defines a stagnation zone about the temperature sensor 20 allowing for more accurate readings.

During operation of the first and second heating elements 60 and 62, the exterior 50 of the airfoil portion 14 of the housing 12 may become quite hot as the first and second heating elements 60 and 62 may generate a great deal of thermal energy. The thermal energy raises the temperature of the airfoil portion 14 of the housing 12 and prevents ice from accumulating on the leading edges of the airfoil portion 14 of the housing 12. This may cause the temperature of the air that touches the airfoil portion 14 of the housing 12 to become warmer than the flow of air surrounding the air temperature sensor 10. The warmed air will also be forced through the passageway 44 and if the warmed air reaches the temperature sensor 20 it will cause the temperature sensor 20 to read the temperature of the warm air instead of the temperature of the free stream air, which is commonly known as a de-icing error.

Figure 5:
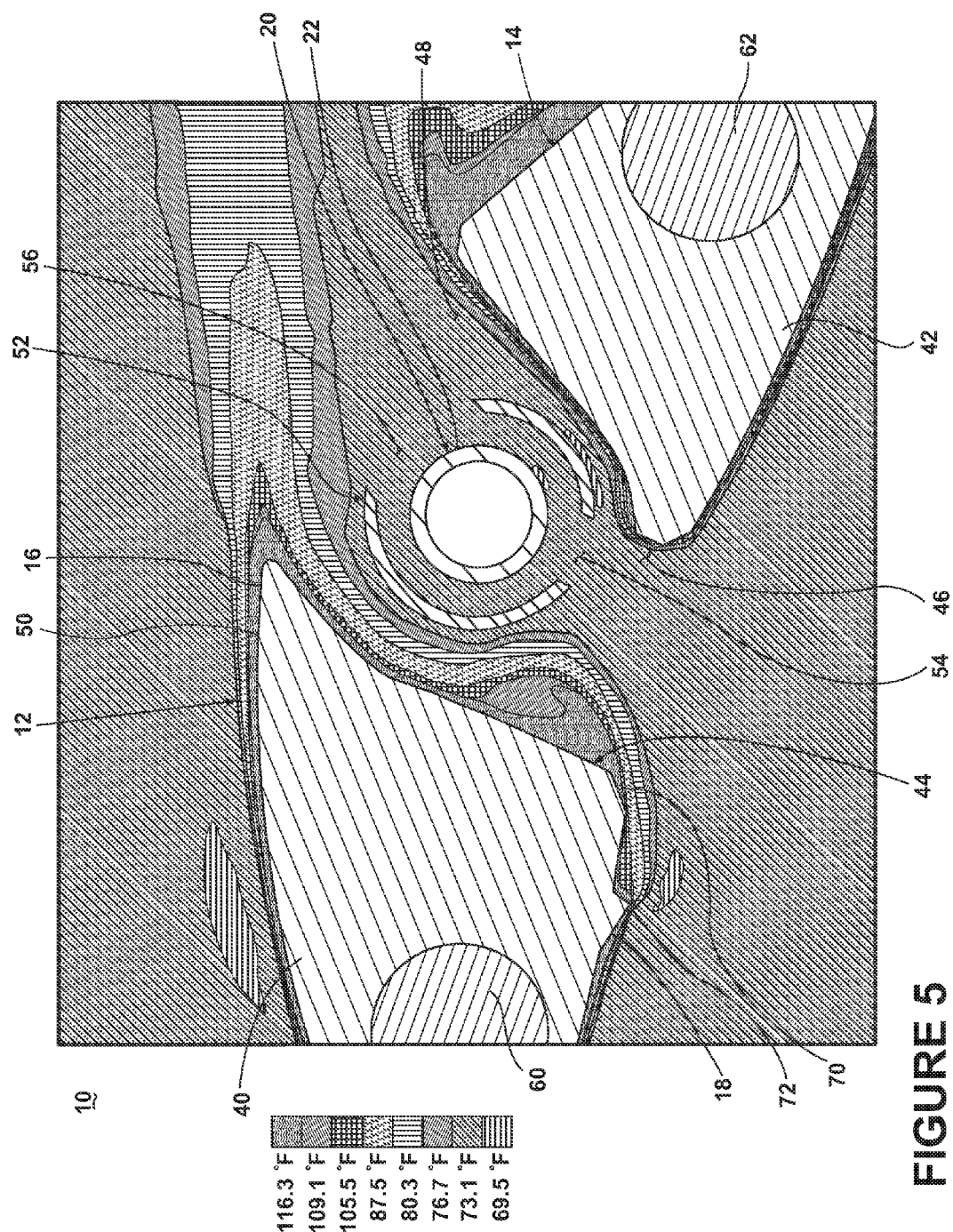
FIG. 5 is a cross-sectional view illustrating exemplary temperature zones created during deicing by the air temperature sensor of FIG. 1.

The sheath 52 may act as a heat shield, which shields the temperature sensor 20 from the heat from the first and second heating elements 60 and 62 and reduces sensing errors. The sheath 52 channels the warmed air away from the temperature sensor 20 and prevents the warmed air from reaching the temperature sensor housing 22 and reduces deicing errors. By way of example only, temperature zones that may be achieved during operation, with the first and second heating elements 60 and 62 operating have been schematically illustrated in FIG. 5. The zones demonstrate that the thermal energy transferred from the exterior 50 of the airfoil portion 14 of the housing 12 to the air through convection does not reach the temperature sensor housing 22 and that a deicing operation will have little effect on the measured temperature of the air.

The above described embodiments provide a variety of advantages including the ability to provide accurate total temperature readings regardless of adverse weather conditions. The embodiments provide accurate temperature readings by preventing water from reaching the temperature sensor, reducing the velocity of air contacting the temperature sensor, and shielding the temperature sensor from deicing errors. This improves the accuracy of the temperature sensor reading. The more accurately the air temperature is know the better understanding of the flow conditions in the engine. This lets the engines run longer between service intervals and increases fuel savings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air temperature sensor suitable for use on an aircraft, the temperature sensor comprising:
  a housing having at least a portion with an airfoil cross section to define an airfoil portion with an upper surface and a lower surface;
  a temperature sensor located within the airfoil portion; and
  an air flow path having an inlet in the lower surface of the housing and extending through the housing to the temperature sensor to provide for diverted air from air flowing along the lower surface to contact the temperature sensor;
  wherein a transition element formed on the lower surface of the housing by a junction of the inlet and the lower surface prevents liquid entrained in an airflow along the lower surface from reaching the temperature sensor.

2. The air temperature sensor of claim 1 wherein a shape of the junction defines an angle that can be turned by the air flow but not by the entrained liquid causing the entrained liquid to not follow the diverted air.

3. The air temperature sensor of claim 2 wherein the angle is about 53 degrees.

4. The air temperature sensor of claim 2 wherein the air flow path extends through the airfoil portion with an outlet on the upper surface.

5. The air temperature sensor of claim 4, further comprising a sheath at least partially circumscribing the temperature sensor.

6. The air temperature sensor of claim 5 wherein the sheath comprises an inlet opening through which the diverted air contacts the temperature sensor.

7. The air temperature sensor of claim 5, further comprising a heating element located within the airfoil portion and the sheath shields the temperature sensor from the heat from the heating element.

8. The air temperature sensor of claim 7 wherein there are two heating elements located within the airfoil portion on opposite sides of the air flow path.

9. The air temperature sensor of claim 1, further comprising a passageway extending through the airfoil portion, with the passageway defining the air flow path.

10. The air temperature sensor of claim 9 wherein the passageway has an outlet located on an exterior of the airfoil portion.

11. The air temperature sensor of claim 10 wherein the outlet is provided on the upper surface.

12. The air temperature sensor of claim 1, further comprising a sheath at least partially circumscribing the temperature sensor.

13. The air temperature sensor of claim 12 wherein the sheath comprises an inlet opening through which the diverted air contacts the temperature sensor.

14. The air temperature sensor of claim 13 wherein the sheath defines a stagnation zone about the temperature sensor.

15. The air temperature sensor of claim 1, further comprising a heating element located within the airfoil portion.

16. The air temperature sensor of claim 15 wherein there are two heating elements located within the airfoil portion on opposite sides of the air flow path.

17. The air temperature sensor of claim 15, further comprising a heat shield shielding the temperature sensor from the heat from the heating element.

18. The air temperature sensor of claim 1 wherein the airfoil portion has an asymmetrical cross section.

19. An air temperature sensor suitable for use on an aircraft, the temperature sensor comprising:
    a housing having at least a portion with an airfoil cross section to define an airfoil portion with an upper surface and a lower surface;
    a temperature sensor located within the airfoil portion;
    an air flow path having an inlet in the lower surface and extending to the temperature sensor to provide for diverted air from air flowing along the lower surface to contact the temperature sensor; and
    a drip guard located along the lower surface and upstream of the inlet
    wherein a transition formed by a junction of the inlet and the lower surface prevents liquid entrained in an airflow along the lower surface from reaching the temperature sensor.

\* \* \* \* \*